United States Patent
Casper et al.

(10) Patent No.: US 8,972,615 B2
(45) Date of Patent: *Mar. 3, 2015

(54) COMMUNICATION WITH INPUT/OUTPUT SYSTEM DEVICES

(71) Applicant: International Business Machines Corporation, Armonk, NY (US)

(72) Inventors: Daniel F. Casper, Poughkeepsie, NY (US); Patricia G. Driever, Poughkeepsie, NY (US); John R. Flanagan, Poughkeepsie, NY (US); Louis W. Ricci, Poughkeepsie, NY (US); Gustav E. Sittmann, III, Webster Groves, MO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/707,733

(22) Filed: Dec. 7, 2012

(65) Prior Publication Data

US 2013/0097339 A1    Apr. 18, 2013

Related U.S. Application Data

(63) Continuation of application No. 12/617,055, filed on Nov. 12, 2009, now Pat. No. 8,332,542.

(51) Int. Cl.
G06F 3/00    (2006.01)

(52) U.S. Cl.
USPC ............ 710/5; 710/6; 710/7; 710/36

(58) Field of Classification Search
USPC .................................. 710/5, 6, 7, 36
See application file for complete search history.

(56) References Cited

U.S. PATENT DOCUMENTS 3,693,161 A    9/1972    Price et al.
3,943,283 A    3/1976    Caragliano et al.
(Continued)

FOREIGN PATENT DOCUMENTS

DE    3931514    3/1990
GB    1264096    2/1972
(Continued)

OTHER PUBLICATIONS

U.S. Appl. No. 12/031,023 Non Final Office Action mailed Jun. 11, 2010.
(Continued)

*Primary Examiner* — Chun-Kuan Lee
*Assistant Examiner* — Jasjit Vidwan
(74) *Attorney, Agent, or Firm* — Cantor Colburn LLP; Steven Chiu (57) ABSTRACT

A computer program product is provided for performing: obtaining, by a channel subsystem, a transport command word (TCW) specified by an operating system, the TCW comprising an address of a transport services request block (TSRQB) and an address of a transport services response block (TSRSB); obtaining the TSRQB; building at least one command request based on the TSRQB, and sending the at least one command request from the channel subsystem to at least one network entity, the at least one command request including at least one of a fiber-channel generic services (FC-GS) request, a fiber-channel link services (FC-LS) request, and a fiber-channel link-level function (FC-SB) request; receiving a response to the at least one command request from the at least one network entity; and storing the response to the TSRSB based on the address of the TSRSB obtained from the TCW.

24 Claims, 7 Drawing Sheets

(56) References Cited

U.S. PATENT DOCUMENTS

| | | | |
|---|---|---|---|
| 4,004,277 A | 1/1977 | Gavril | |
| 4,080,649 A | 3/1978 | Calle et al. | |
| 4,207,609 A | 6/1980 | Luiz et al. | |
| 4,374,415 A | 2/1983 | Cormier et al. | |
| 4,380,046 A | 4/1983 | Frosch et al. | |
| 4,414,644 A | 11/1983 | Tayler | |
| 4,455,605 A | 6/1984 | Cormier et al. | |
| 4,497,022 A | 1/1985 | Cormier et al. | |
| 4,564,903 A | 1/1986 | Guyette et al. | |
| 4,760,518 A | 7/1988 | Potash et al. | |
| 4,779,188 A | 10/1988 | Gum et al. | |
| 4,837,677 A | 6/1989 | Burrus, Jr. et al. | |
| 4,843,541 A | 6/1989 | Bean et al. | |
| 4,866,609 A | 9/1989 | Calta et al. | |
| 4,870,566 A | 9/1989 | Cooper et al. | |
| 5,016,160 A | 5/1991 | Lambeth et al. | |
| 5,031,091 A | 7/1991 | Wakatsuki et al. | |
| 5,040,108 A | 8/1991 | Kanazawa | |
| 5,170,472 A | 12/1992 | Cwiakala et al. | |
| 5,185,736 A | 2/1993 | Tyrrell et al. | |
| 5,237,325 A | 8/1993 | Klein et al. | |
| 5,265,240 A | 11/1993 | Galbraith et al. | |
| 5,297,262 A | 3/1994 | Cox et al. | |
| 5,301,323 A | 4/1994 | Maeurer et al. | |
| 5,317,739 A | 5/1994 | Elko et al. | |
| 5,325,492 A | 6/1994 | Bonevento et al. | |
| 5,386,512 A | 1/1995 | Crisman et al. | |
| 5,388,219 A | 2/1995 | Chan et al. | |
| 5,410,727 A | 4/1995 | Jaffe et al. | |
| 5,414,851 A | 5/1995 | Brice, Jr. et al. | |
| 5,434,980 A | 7/1995 | Casper et al. | |
| 5,440,729 A | 8/1995 | Kimura et al. | |
| 5,452,455 A | 9/1995 | Brown et al. | |
| 5,461,721 A | 10/1995 | Cormier et al. | |
| 5,463,736 A | 10/1995 | Elko et al. | |
| 5,465,359 A | 11/1995 | Allen et al. | |
| 5,500,942 A | 3/1996 | Eickemeyer et al. | |
| 5,517,670 A | 5/1996 | Allen et al. | |
| 5,526,484 A | 6/1996 | Casper et al. | |
| 5,528,755 A | 6/1996 | Beardsley et al. | |
| 5,539,918 A | 7/1996 | Allen et al. | |
| 5,546,533 A | 8/1996 | Koyama | |
| 5,548,791 A | 8/1996 | Casper et al. | |
| 5,561,809 A | 10/1996 | Elko et al. | |
| 5,564,040 A | 10/1996 | Kubala | |
| 5,568,648 A | 10/1996 | Coscarella et al. | |
| 5,584,039 A | 12/1996 | Johnson et al. | |
| 5,600,793 A | 2/1997 | Nord | |
| 5,600,805 A | 2/1997 | Fredericks et al. | |
| 5,608,898 A | 3/1997 | Turpin et al. | |
| 5,613,163 A | 3/1997 | Marron et al. | |
| 5,640,600 A | 6/1997 | Satoh et al. | |
| 5,640,603 A | 6/1997 | Meritt et al. | |
| 5,644,712 A | 7/1997 | Coscarella et al. | |
| 5,671,441 A | 9/1997 | Glassen et al. | |
| 5,680,580 A | 10/1997 | Beardsley et al. | |
| 5,758,190 A | 5/1998 | Johnson et al. | |
| 5,768,620 A | 6/1998 | Johnson et al. | |
| 5,787,071 A | 7/1998 | Basso et al. | |
| 5,793,983 A | 8/1998 | Albert et al. | |
| 5,812,877 A | 9/1998 | Young | |
| 5,831,985 A | 11/1998 | Sandorfi | |
| 5,845,146 A | 12/1998 | Onodera | |
| 5,860,022 A | 1/1999 | Kondou et al. | |
| 5,894,583 A | 4/1999 | Johnson et al. | |
| 5,901,327 A | 5/1999 | Ofek | |
| 5,907,684 A | 5/1999 | Halma et al. | |
| 5,918,028 A | 6/1999 | Silverthorn et al. | |
| 5,996,026 A | 11/1999 | Onodera et al. | |
| 6,125,399 A | 9/2000 | Hamilton | |
| 6,125,411 A | 9/2000 | Sato | |
| 6,195,330 B1 | 2/2001 | Sawey et al. | |
| 6,202,095 B1 | 3/2001 | Beardsley et al. | |
| 6,230,218 B1 | 5/2001 | Casper et al. | |
| 6,249,787 B1 | 6/2001 | Schleimer et al. | |
| 6,263,380 B1 | 7/2001 | Tsuboi et al. | |
| 6,338,105 B1 | 1/2002 | Niizuma et al. | |
| 6,343,335 B1 | 1/2002 | Dahman et al. | |
| 6,347,334 B1 | 2/2002 | Fredericks et al. | |
| 6,351,779 B1 | 2/2002 | Berg et al. | |
| 6,353,612 B1 | 3/2002 | Zhu et al. | |
| 6,401,223 B1 | 6/2002 | DePenning | |
| 6,460,087 B1 | 10/2002 | Saito et al. | |
| 6,466,590 B1 | 10/2002 | Park et al. | |
| 6,484,217 B1 | 11/2002 | Fuente et al. | |
| 6,546,435 B1 | 4/2003 | Yoshimura et al. | |
| 6,584,511 B1 | 6/2003 | Marsh, III et al. | |
| 6,594,785 B1 | 7/2003 | Gilbertson et al. | |
| 6,609,161 B1 | 8/2003 | Young | |
| 6,609,165 B1 | 8/2003 | Frazier | |
| 6,647,016 B1 | 11/2003 | Isoda et al. | |
| 6,651,125 B2 | 11/2003 | Maergner et al. | |
| 6,654,954 B1 | 11/2003 | Hicks | |
| 6,658,603 B1 | 12/2003 | Ward | |
| 6,687,766 B1 | 2/2004 | Casper et al. | |
| 6,693,880 B2 | 2/2004 | Gregg et al. | |
| 6,694,390 B1 | 2/2004 | Bogin et al. | |
| 6,751,680 B2 | 6/2004 | Langerman et al. | |
| 6,751,683 B1 | 6/2004 | Johnson et al. | |
| 6,769,009 B1 | 7/2004 | Reisman | |
| 6,772,207 B1 | 8/2004 | Dorn et al. | |
| 6,826,661 B2 | 11/2004 | Umbehocker et al. | |
| 6,839,773 B2 | 1/2005 | Vishlitzky et al. | |
| 6,862,322 B1 | 3/2005 | Ewen et al. | |
| 6,898,202 B2 | 5/2005 | Gallagher et al. | |
| 6,915,378 B2 | 7/2005 | Roberti | |
| 6,950,888 B1 | 9/2005 | Rooney et al. | |
| 6,963,940 B1 | 11/2005 | Glassen et al. | |
| 7,000,036 B2 | 2/2006 | Carlson et al. | |
| 7,003,700 B2 | 2/2006 | Elko et al. | |
| 7,020,810 B2 | 3/2006 | Holman | |
| 7,035,540 B2 | 4/2006 | Finan et al. | |
| 7,058,735 B2 | 6/2006 | Spencer | |
| 7,085,860 B2 | 8/2006 | Dugan et al. | |
| 7,100,096 B2 | 8/2006 | Webb, Jr. et al. | |
| 7,111,130 B2 * | 9/2006 | Blake et al. | 711/147 |
| 7,120,728 B2 | 10/2006 | Krakirian et al. | |
| 7,124,207 B1 | 10/2006 | Lee et al. | |
| 7,133,988 B2 | 11/2006 | Fujibayashi | |
| 7,149,823 B2 | 12/2006 | Miller et al. | |
| 7,155,569 B2 | 12/2006 | Johnson et al. | |
| 7,164,425 B2 | 1/2007 | Kwak et al. | |
| 7,174,274 B2 | 2/2007 | Carlson et al. | |
| 7,202,801 B2 | 4/2007 | Chou | |
| 7,277,387 B2 | 10/2007 | Sanders et al. | |
| 7,292,597 B2 | 11/2007 | Mills et al. | |
| 7,315,911 B2 | 1/2008 | Davies et al. | |
| 7,373,435 B2 | 5/2008 | Carlson et al. | |
| 7,382,733 B2 | 6/2008 | Banerjee et al. | |
| 7,395,284 B2 | 7/2008 | Sato et al. | |
| 7,398,335 B2 | 7/2008 | Sonksen et al. | |
| 7,484,021 B2 | 1/2009 | Rastogi et al. | |
| 7,500,023 B2 * | 3/2009 | Casper et al. | 710/5 |
| 7,500,030 B2 | 3/2009 | Hathorn et al. | |
| 7,502,873 B2 | 3/2009 | Casper et al. | |
| 7,512,133 B2 | 3/2009 | Dugan et al. | |
| 7,516,248 B2 | 4/2009 | Carlson et al. | |
| 7,539,777 B1 | 5/2009 | Aitken | |
| 7,543,087 B2 | 6/2009 | Philbrick et al. | |
| 7,555,554 B2 | 6/2009 | Manders et al. | |
| 7,558,827 B2 | 7/2009 | Kawashima et al. | |
| 7,564,791 B2 | 7/2009 | Jayakrishnan et al. | |
| 7,577,772 B2 | 8/2009 | Sonksen et al. | |
| 7,577,773 B1 | 8/2009 | Gandhi et al. | |
| 7,594,057 B1 | 9/2009 | Gandhi et al. | |
| 7,599,360 B2 | 10/2009 | Edsall et al. | |
| 7,600,053 B2 | 10/2009 | Carlson et al. | |
| 7,711,871 B1 | 5/2010 | Haechten et al. | |
| 7,743,197 B2 | 6/2010 | Chavan et al. | |
| 7,765,336 B2 | 7/2010 | Butler et al. | |
| 7,826,349 B2 | 11/2010 | Kaur et al. | |
| 7,840,717 B2 | 11/2010 | Flanagan et al. | |
| 7,840,718 B2 | 11/2010 | Ricci et al. | |
| 7,840,719 B2 | 11/2010 | Casper et al. | |

(56) References Cited

U.S. PATENT DOCUMENTS

| | | | |
|---|---|---|---|
| 7,856,511 B2 | 12/2010 | Ricci et al. |
| 7,941,570 B2 | 5/2011 | Flanagan et al. |
| 8,495,253 B2 | 7/2013 | Flanagan et al. |
| 2001/0030943 A1 | 10/2001 | Gregg et al. |
| 2002/0032810 A1 | 3/2002 | Wagner |
| 2002/0062407 A1 | 5/2002 | Tateyama et al. |
| 2002/0099967 A1 | 7/2002 | Kawaguchi |
| 2002/0152338 A1 | 10/2002 | Elliott et al. |
| 2002/0178404 A1 | 11/2002 | Austen et al. |
| 2003/0002492 A1 | 1/2003 | Gallagher et al. |
| 2003/0056000 A1 | 3/2003 | Mullendore et al. |
| 2003/0084213 A1 | 5/2003 | Brice, Jr. et al. |
| 2003/0103504 A1 | 6/2003 | Dugan et al. |
| 2003/0158998 A1 | 8/2003 | Smith |
| 2003/0187627 A1 | 10/2003 | Hild et al. |
| 2003/0188053 A1 | 10/2003 | Tsai |
| 2003/0208581 A1* | 11/2003 | Behren et al. ............... 709/223 |
| 2004/0030822 A1 | 2/2004 | Rajan et al. |
| 2004/0054776 A1 | 3/2004 | Klotz et al. |
| 2004/0113772 A1 | 6/2004 | Hong Chou |
| 2004/0125960 A1 | 7/2004 | Fosgate et al. |
| 2004/0136241 A1 | 7/2004 | Rapp et al. |
| 2004/0151160 A1 | 8/2004 | Sanders et al. |
| 2004/0193968 A1 | 9/2004 | Dugan et al. |
| 2004/0210719 A1 | 10/2004 | Bushey et al. |
| 2004/0230706 A1 | 11/2004 | Carlson et al. |
| 2004/0260851 A1 | 12/2004 | Tu |
| 2005/0018673 A1 | 1/2005 | Dropps et al. |
| 2005/0099954 A1 | 5/2005 | Mohan et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0193029 A1 | 9/2005 | Rom et al. |
| 2005/0204069 A1 | 9/2005 | Carlson et al. |
| 2005/0216617 A1 | 9/2005 | Carlson et al. |
| 2005/0223291 A1 | 10/2005 | Zimmer et al. |
| 2005/0229033 A1 | 10/2005 | Tanaka et al. |
| 2005/0257118 A1 | 11/2005 | Shien |
| 2006/0036769 A1 | 2/2006 | Frey et al. |
| 2006/0050726 A1 | 3/2006 | Ahmed et al. |
| 2006/0075154 A1 | 4/2006 | Carlson et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0005838 A1 | 1/2007 | Chang et al. |
| 2007/0016554 A1 | 1/2007 | Dapp et al. |
| 2007/0061463 A1 | 3/2007 | Hiramatsu et al. |
| 2007/0072543 A1 | 3/2007 | Paila et al. |
| 2007/0079022 A1 | 4/2007 | Carlson et al. |
| 2007/0079051 A1 | 4/2007 | Tanaka et al. |
| 2007/0091497 A1 | 4/2007 | Mizuno et al. |
| 2007/0162631 A1 | 7/2007 | Balakrishnan et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0043563 A1 | 2/2008 | Brice et al. |
| 2008/0059638 A1 | 3/2008 | Hathorn et al. |
| 2008/0103754 A1 | 5/2008 | Carlson et al. |
| 2008/0103755 A1 | 5/2008 | Carlson et al. |
| 2008/0109580 A1 | 5/2008 | Carlson et al. |
| 2008/0147889 A1 | 6/2008 | Casper et al. |
| 2008/0147890 A1 | 6/2008 | Casper et al. |
| 2008/0183877 A1 | 7/2008 | Carlson et al. |
| 2008/0235553 A1 | 9/2008 | Chintada |
| 2008/0256264 A1 | 10/2008 | Muto et al. |
| 2008/0273518 A1 | 11/2008 | Pratt |
| 2008/0307122 A1 | 12/2008 | Butler et al. |
| 2009/0049241 A1 | 2/2009 | Ohno et al. |
| 2009/0055585 A1 | 2/2009 | Fernandes et al. |
| 2009/0144586 A1 | 6/2009 | Casper et al. |
| 2009/0172203 A1 | 7/2009 | Casper et al. |
| 2009/0201537 A1* | 8/2009 | Araya ............... 358/1.15 |
| 2009/0210557 A1 | 8/2009 | Gainey, Jr. et al. |
| 2009/0210559 A1 | 8/2009 | Flanagan et al. |
| 2009/0210560 A1 | 8/2009 | Yudenfriend et al. |
| 2009/0210561 A1 | 8/2009 | Ricci et al. |
| 2009/0210562 A1 | 8/2009 | Huang et al. |
| 2009/0210563 A1 | 8/2009 | Flanagan et al. |
| 2009/0210564 A1 | 8/2009 | Ricci et al. |
| 2009/0210570 A1 | 8/2009 | Bendyk et al. |
| 2009/0210571 A1 | 8/2009 | Casper et al. |
| 2009/0210572 A1 | 8/2009 | Yudenfriend et al. |
| 2009/0210573 A1 | 8/2009 | Yudenfriend et al. |
| 2009/0210576 A1 | 8/2009 | Casper et al. |
| 2009/0210579 A1 | 8/2009 | Bendyk et al. |
| 2009/0210580 A1 | 8/2009 | Bendyk et al. |
| 2009/0210581 A1 | 8/2009 | Flanagan et al. |
| 2009/0210582 A1 | 8/2009 | Bendyk et al. |
| 2009/0210583 A1 | 8/2009 | Bendyk et al. |
| 2009/0210584 A1 | 8/2009 | Carlson et al. |
| 2009/0210585 A1 | 8/2009 | Ricci et al. |
| 2009/0210768 A1 | 8/2009 | Carlson et al. |
| 2009/0210769 A1 | 8/2009 | Casper et al. |
| 2009/0210884 A1 | 8/2009 | Ricci et al. |
| 2009/0307388 A1 | 12/2009 | Tchapda |
| 2010/0014526 A1 | 1/2010 | Chavan et al. |
| 2010/0030919 A1 | 2/2010 | Flanagan et al. |
| 2010/0030920 A1 | 2/2010 | Casper et al. |
| 2010/0064072 A1 | 3/2010 | Tang et al. |
| 2010/0299460 A1 | 11/2010 | Wang |
| 2011/0113159 A1 | 5/2011 | Casper et al. |

FOREIGN PATENT DOCUMENTS

| | | |
|---|---|---|
| GB | 2291990 A | 9/1995 |
| GB | 2291990 | 2/1996 |
| JP | 63236152 | 10/1988 |
| JP | 2010-140127 A | 6/2010 |
| WO | 2006102664 A2 | 9/2006 |

OTHER PUBLICATIONS

U.S. Appl. No. 12/183,323 Non Final Office Action mailed Jul. 19, 2010.
U.S. Appl. No. 12/392,246 Notice of Allowance mailed Jul. 15, 2010.
U.S. Appl. No. 12/183,305, filed Jul. 31, 2008.
Vaghani, SB.; "Virtual Machine File System"; VMWare Inc./ACM Digital Library; pp. 57-69; 2008-2009.
Z/Architecture • Principles of Operation SA 22-7832-01 International Business Machines Corporation, 2nd Edition, Oct. 2001, 1214 pages.
URL, http://en.wikipedia.org/wiki/FICON, FICON, Wikipedia, USA, Wikimedia Foundation, Inc., Aug. 9, 2011, pp. 1-3.
U.S. Appl. No. 13/024,468, Non Final Office Action Mailed Jan. 26, 2012.
U.S. Appl. No. 12/030,912, Final Office Action Mailed Feb. 27, 2012.
U.S. Appl. No. 12/031,182 Non-Final Office Action dated Mar. 16, 2012.
U.S. Appl. No. 13/075,993, Final Office Action Mailed Feb. 13, 2012.
U.S. Appl. No. 13/075,993 Non Final Office Action Mailed Aug. 31, 2011.
U.S. Appl. No. 12/030,981, Notice of Allowance mailed Jan. 27, 2012.
U.S. Appl. No. 12/031,023, Non-Final Office Action Mailed Feb. 1, 2012.
U.S. Appl. No. 12/031,023, Notice of Allowance Mailed Jul. 5, 2012.
U.S. Appl. No. 13/351,073, Non Final Office Action Mailed Mar. 30, 2012.
U.S. Appl. No. 13/351,073 Notice of Allowance Mailed Apr. 15, 2013.
U.S. Appl. No. 12/030,993 Notice of Allowance Mailed Dec. 22, 2011.
U.S. Appl. No. 12/031,042, Notice of Allowance Mailed Feb. 29, 2012.
U.S. Appl. No. 13/150,539, Non-Final Office Action Mailed Mar. 2, 2012.
U.S. Appl. No. 13/150,583, Non-Final Office Action Mailed Feb. 3, 2012.

(56) References Cited

OTHER PUBLICATIONS

U.S. Appl. No. 13/173,733, Non-Final Office Action Mailed Feb. 7, 2012.
U.S. Appl. No. 13/173,772 Non Final Office Action Mailed Feb. 3, 2012.
U.S. Appl. No. 12/030,951, Final Office Action Mailed Oct. 26, 2010.
U.S. Appl. No. 12/030,951, Notice of Allowance Mailed Apr. 4, 2011.
U.S. Appl. No. 12/030,961 Notice of Allowance Mailed Nov. 5, 2010.
U.S. Appl. No. 12/030,967 Notice of Allowance Mailed, Oct. 7, 2010.
U.S. Appl. No. 12/030,067, Notice of Allowance mailed Apr. 23, 2010.
U.S. Appl. No. 12/031,201 Final Office Action dated Jun. 13, 2011.
U.S. Appl. No. 12/031,201, Final Office Action Mailed Aug. 3, 2010.
U.S. Appl. No. 12/031,201, Non-Final Office Action Mailed Dec. 27, 2011.
LSI; "ScsiPortGetDeivceBase"; GOOGLE/LSI; Apr. 2003, 3 pages.
U.S. Appl. No. 12/0303,985, Non Final Office Action Mailed May 5, 2010.
U.S. Appl. No. 12/030,985, Notice of Allowance mailed Nov. 24, 2010.
U.S. Appl. No. 12/030,989, Notice of Allowance Mailed Aug. 5, 2011.
U.S. Appl. No. 12/030,993 Final Office Action Mailed Dec. 10, 2010.
U.S. Appl. No. 12/031,042, Final Office Action Mailed Oct. 25, 2010.
U.S. Appl. No. 12/031,042, Non-Final Office Action Mailed Apr. 5, 2010.
U.S. Appl. No 12/031,042, Non-Final Office Acton Mailed Sep. 30, 2011.
U.S. Appl. No. 12/031,021, Notice of Allowance Mailed Apr. 30, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/364,615, Notice of Allowance Mailed Mar. 10, 2011.
U.S. Appl. No. 12/946,514, Non-Final Office Action Mailed Jun. 23, 2011.
U.S. Appl. No. 12/183,305, Non-Final Office Action Mailed May 11, 2010.
U.S. Appl. No. 12/183,305, Notice of Allowance Mailed Nov. 1, 2010.
U.S. Appl. No. 12/183,315, Notice of Allowance Mailed Dec. 13, 2010.
U.S. Appl. No. 12/183,315 Notice of Allowance dated Sep. 15, 2010.
U.S. Appl. No. 12/183,323, Non-Final Office Action Mailed Jan. 3, 2011.
U.S. Appl. No. 12/183,323, Notice of Allowance Mailed Jun. 23, 2011.
U.S Appl. No. 12/617,055, Final Office Action Mailed Nov. 3, 2011.
U.S. Appl. No. 12/617,055, Non Final Office Action Mailed Jun. 23, 2011.
IBM, "Method and Apparatus to Monitor PAV Utilization", Feb. 2005, pp. 1-3. http://priorartdatabase.com/IPCOM/000082878.
IBM® z/Architecture Principles of Operation, Publication No. SA22-7832-05, 6th Edition, Apr. 2007. 1,215 pages separated into 4 electronic attachments_Part 1.
IBM® z/Architecture Principles of Operation, Publication No. SA22-7832-05, 6th Edition, Apr. 2007. 1,215 pages separated into 4 electronic attachments. Part 2.
IBM® z/Architecture Principles of Operation, Publication No. SA22-7832-05, 6th Edition, Apr. 2007. 1,215 pages separated into 4 electronic attachments. Part 3.
IBM® z/Architecture Principles of Operation, Publication No. SA22-7832-05, 6th Edifion, Apr. 2007. 1,215 pages separated into 4 electronic attachments. Part 4.
Z/Series Input/Output Configuration Program user•s Guide for IYP IOCP, SB10-7029-03c. International Business Machines Corporation, Jun. 2003, 372 pages.
Iren, et al.; "The Transport Layer: Tutorial and Survey"; ACM Computing Surveys; vol. 31, No. 4; Dec. 1990; pp. 360-405.
Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.
International Search Report and Written Opinion for PCT/EP2009/051447 dated Jul. 1, 2009.
International Search Report and Written Opinion for PCT/EP2009/051483 dated Jul. 27, 2009.
Written Opinion and International Search Report for PCT/EP2009/051445 dated Jun. 25, 2009.
Written Opinion and International Search Report for PCT/EP2009/051446 dated Sep. 25, 2009.
Written Opinion and International Search Report for PCT/EP2009/051461 dated Sep. 22, 2009
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and Internatonal Search Report for PCT/EP2009/051463 dated Jul. 22, 2009.
Jiang J.-et al.; "The Role of FCoE in I/O Consolidation"; ACM Digital Library/International Conf on Advanced Infocomm Technology '08; Jul. 2008, 6 pages.
Josephson, WK.-et al.; "DFS: A File System or Virtualized Flash Storage"; ACM Digital Library; vol. 6, No. 3, Article 14, Sep. 2010, pp. 1-15.
LSI Corporation; "PCI Express to 6Gb/s SAS Host Bus Adapters"; GOOGLE; Chapter 1, Introduction/Ovewiew; LSI User Guide; Oct. 2009, pp. 1-28.
Magoutis, K.; "The Optimistic Direct Access File System: Design and Network Interface Support"; Division of Engineering & Applied Science, Harvard Univ.; Feb. 2002.
Magoutis, K.; "The Optimistic Direct Access File System: Design and Network Interface Support"; Division of Engineering & Applied Science, Harvard Univ.; Feb. 2002, pp. 1-12.
Miller, DJ.-et al.; "Motivating Future Interconnects: A Differential Measurement Analysis of PCI Latency"; ACM Digital Library; pp. 94-105; Oct. 2009.
Moore et al., Reconfiguration of Storage Elements to Improve Performance, IBM, Dec. 1983, pp. 1-3. http://priorartdatabas.com/IPCOM/000047719.
Network Storage Systems; GOOGLE; Oct. 2007, pp. 1-7.
Nordstrom.; "Sequence Reception Method for a Fibre Channel Protocol Chip"; IBM Technical Disclosure Bulletin; vol. 38, No. 12; Dec. 1995, pp. 267-269.
Sun, Oracle; "Sun Storage 6 Gb SAS PCIe HBA, External-Installation Guide for HBA Models"; GOOGLE; Revision A; Nov. 2010. 80 pages.
Petersen, MK.-et al.; "DIF/DIX Aware Linux SCSI HBA Interface"; GOOGLE; Oracle Linux Engineering; Jul. 2008, pp. 1-258.
Peterson; "Information Techonoiogy, Fibre Channel Protocol for SCSI, Fourth Version (FCP-3)", Draft Proposed American National Standard, Jun. 2004; pp. 1-142.
Patent No. 7,000,036 Notice of Allowance dated Feb. 3, 2006.
Patent No. 7,000,036 Non-Final Office Action dated Jul. 15, 2005.
Patent No. 7, 174,274 Non-Final Office Action dated Jun. 8, 2006.
Patent No. 7,174,274 Non-Final Office Action dated Jun. 21, 2006.
Patent No. 7,174,274 Notice of Allowance Sep. 13, 2007.
Patent No. 7,174,274 Notice of Allowance Dec. 27, 2006.
U.S. Appl. No. 11/126,728 Non-Final Office Action Apr. 16, 2007.
Patent No. 7,373,435 Non-Final Office Action May 11, 2007.
Patent No. 7,373, 435 Non-Final Office Action Sep. 13, 2007.
Patent No. 7,373,435 Notice of Allowance dated Apr. 30, 2008.
U.S. Appl. No. 11/469,573 Non-Final Office Action dated Apr. 11, 2008.
Patent No. 7,600,053 Non-Final Office Action dated Mar. 17, 2009.
Patent No. 7,600,053 Notice of Allowance dated Aug. 26, 2009.
U.S. Appl. No. 11/965,866 Non-Final Office Action dated Jun. 3, 2010.

(56) References Cited

OTHER PUBLICATIONS

Patent No. 7,516,248 Notice of Allowance Feb. 20, 2009.
U.S. Appl. No. 11/548,060 Non-Final Office Action dated Apr. 15, 2008.
U.S. Appl. No. 11/548,093 Non-Final Office Action dated Apr. 17, 2008.
U.S. Appl. No. 12/031,182 Non-Final Office Action dated Jan. 22, 2010.
U.S. Appl. No. 12/031,201 Non-Final Office Action dated Jan. 25, 2010.
U.S. Appl. No. 12/030,989 Final Office Action dated May 24, 2010.
U.S. Appl. No. 12/183,315, Notice of Allowance Mailed on Jun. 15, 2010.
International Search Report, International Application No. PCT/EP2009/059184; International Filing Date: Jul. 16, 2009; Date of mailing: Jan. 14, 2010; 9 pages.
"Protocol for Insochronous Traffic Over Fiber Channel Switching"; IBM Technical Disclosure Bulletin; vol. 37, No. 06B; Jun. 1994. pp. 377-380.
Golasky, Richard; "Link-Level Error Recovery With Tape Backup"; Dell Power Solutions; Aug. 2005; pp. 88-91.
Sachs, M.W.; "I/O Marker Changing"; IBM Technical Disclosure Bulletin; vol. 37, No. 02A; Feb. 1994; pp. 75-76.
Satran, J.-et al.; Network Working Group; "Internet Small Computer Systems Interface (iSCSI)"; ACM Digital Library; RFC3720; Apr. 2004, pp. 1-258.
SCSI Primary Commands—4 (SPC-4); Project T10/1731-D. Rev 11. INCITS Apr. 14, 2010.
Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.
Snively, et al.; "Fibre Channel, Framing and Signaling"; (FC-FS) Rev. 1.70; NCITS Working Draft Proposed American Nationai Standard for Information Technology; Feb. 2002; pp. 1-575.
Snively et al.; Fibre Channel Single Byte Command Code Sets-3 Mapping Protocol (FC-SB-3); T11/Project 1357-D/Rev. 1.6, INCITS; Mar. 2003; pp. 1-206.
Srikrishnan et al.; "Sharing FCP Adapters Through Virtualization", IBM J. Res. & Dev., vol. 51, No. 1/2; Jan./Mar. 2007; pp. 103-118.
Stone, et al.; "When the CRC and TCP Checksum Disagree"; SIGCOMM '00, Stockholm, Sweden; Jul. 2000; 10 pages.
Laudon et al. •System Overview of the SGI Origin 200/2000 Product Line, 1997, IEEE Publication pp. 150-156.
Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.
U.S. Appl. No. 12/183,315, filed Jul. 31, 2008.
U.S. Appl. No. 12/183,323, filed Jul. 31, 2008.
U.S. Appl. No. 12/030,939 Notice of Allowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/030,967 Restriction Requirement Mailed Dec. 29, 2009.
Aboda, B.-et al.; Network Working Group; "Securing Block Storage Protocols Over IP"; ACM Digital Library; RFC3723; Apr. 2004, 66 pages.
ANSI INCITS 433-2007, Information Technology Fibre Channel Link Services (FC-LS), Jul. 2007, 211 pages.
Azimi, R.-et al.; "miNI: Reducing Network Interface Memory Requirements with Dynamic Handle Lookup"; ACM Digital Library; pp. 261-272; Jun. 2003.
Behrs, Jr, "Adaptive Prediction Minimizes Data Overrun and Underrun", IBM, Nov. 1994. pp. 1-3. http://priorartdatabase.com/IPCOM/000114189.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
Meritt, A.S. and J.H. Sorg, "Correction of Channel Measurement Data Caused by Control Unit Queuing," IBM Technical Disclosure Bulletin, vol. 33, No. 11, Apr. 1991, pp. 100-103.
Dauby, et al. "Contention Resolution Between Two Processors"; IBM Technical Disclosure Bulletin; vol. 26; No. 10A; Mar. 1984; 3 pages.
DeVeer. J.A.; "Control Frame Multiplexing on Serial I/O Channels"; IBM Technical Disclosure Bulletin; vol. 32; No. 10A; Mar. 1990; pp. 39-40.
Emulex Corporation; "Install the LP850 Host Adapter"; GOOGLE/Emulex Corporation, LightPulse LP850 Fibre Channel PCI Host Adapter Manuals; pp. 1-10, 1999.
Fibre Channel Single Byte Command Cod Sets-2 Mapping Protocol (FC-SB-3), T11/Project 1357-D/Rev 1.6, INCITS Mar. 2003, 206 pages.
"Information Technology—Fibre Channel Protocol for SCSI, Third Version (FCP-3)," T10 Project 1560-D, Revision 4g, Sep. 13, 2005, pp. 1-140.
Foong, A.-et al.; "Towards SSD-Ready Enterprise Platforms"; GOOGLE/INTEL Corporation; 2008-2009, 7 pages.
Hewlett-Packard Company; HP A4800A PCI FWD SCSI Host Bus Adapter—Services & User Guide, Edition 6; GOOGLE/H-P; 2001, pp. 1-64.
Hewlett-Packard Company; "HP A5149 PCI Ultra2 SCSI Host Bus Adapter—Service and User Guide", Edition 2; GOOGLE/H-P; 2001, pp. 1-66.
U.S. Appl. No. 12/031,038 Non-Final Office Acton dated Nov. 16, 2009.
U.S. Appl. No. 12/030,912 Non-Final Office Action dated Mar. 18, 2010.
U.S. Appl. No. 12/030,920 Non-Final Office Action dated Feb. 23, 2010.
U.S. Appl. No. 12/030,975 Non-Final Office Action dated Oct. 22, 2009.
U.S. Appl. No. 12/030,932 Non-Final Office Action dated Dec. 16, 2009.
U.S. Appl. No. 2/031,023 Non-Final Office Action dated Oct. 29, 2009.
U.S. Appl. No. I470034US Non-Final Office Action dated May 20, 2010.
U.S. Appl. No. 12/030,951 Non-Final Office Action dated Nov. 23, 2009.
U.S. Appl. No. 12/030,961 Non-Final Office Action dated Dec. 17, 2009.
U.S. Appl. No. 12/030,939 Non-Final Office Action dated Nov. 16, 2009.
U.S. Appl. No. 12/030,989 Non-Final Office Action dated Oct. 22, 2009.
U.S. Appl. No. 12/030,993 Non-Final Office Action dated Oct. 28, 2009.
U.S. Appl. No. 12/031,021 Non-Final Office Action dated Jan. 8, 2010.
U.S. Appl. No. 12/181,662—Non-Final Office Action dated Jun. 18, 2009.
U.S. Appl. No. 12/181,662—Final Office Action dated Jan. 4, 2010.
U.S. Appl. No. 12/031,038, Notice of Allowance Mailed Oct. 6, 2010.
U.S. Appl. No. 12/031,038, Non-Final Office Action Mailed Apr. 15, 2010.
Final Office Action for U.S. Appl. No. 12/030,912 mailed Oct. 6, 2010.
U.S. Appl. No. 12/030,912 Non Final Office Action Mailed Aug. 18, 2011.
U.S. Appl. No. 12/031,182 Final Office Action Mailed Jul. 22, 2010.
U.S. Appl. No. 12/031,182, Non Final Office Action Mailed Dec. 23, 2010.
U.S. Appl. No. 12/031,182 Final Office Action dated Oct. 20, 2011.

(56) References Cited

OTHER PUBLICATIONS

U.S. Appl. No. 12/030,920, Notice of Allowance Mailed Dec. 28, 2010.
U.S. Appl. No. 12/030,920 Notice of Allowance Mailed Aug. 23, 2010.
U.S. Appl. No. 12/030,925, Notice of Allowance Mailed Feb. 14, 2008.
U.S. Appl. No. 12/030,954 Non-Final Office Action dated Jan. 21, 2010.
U.S. Appl. No. 12/030,954, Notice of Allowance mailed Dec. 28, 2010.
U.S. Appl. No. 12/030,975. Final Office Action Mailed May 13, 2010.
U.S. Appl. No. 12/030,975, Notice of Allowance Malied Oct. 19, 2010.
U.S. Appl. No. 12/030,932, Final Office Action Mailed Jul. 23, 2010.
U.S. Appl. No. 12/030,932 Non-Final Office Action Mailed Dec. 16, 2010.
U.S. Appl. No. 12/030,932, Notice of Allowance mailed Nov. 1, 2011.
U.S. Appl. No. 12/030,981 Non Final Office Action Mailed Aug. 2, 2011.
U.S. Appl. No. 12/031,023, Final Office Action Mailed Nov. 18, 2010.
U.S. Appl. No. 12/030,938, Notice of Allowance Mailed Aug. 8, 2011.

* cited by examiner

ND INPUT/OUTPUT
COMMUNICATION WITH INPUT/OUTPUT SYSTEM DEVICES

REFERENCE TO RELATED APPLICATIONS

The application is a continuation of U.S. patent application Ser. No. 12/617,055 entitled "COMMUNICATION WITH INPUT/OUTPUT SYSTEM DEVICES", filed Nov. 12, 2009, the entirety of which is specifically incorporated herein by reference.

BACKGROUND

1. Field of the Invention

The present disclosure relates generally to input/output processing, and in particular, to communications between an operating system and input/output system devices.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

Fibre Channel interfaces architecture, as standardized in the T11 Technical Committee of the International Committee for Information Technology Standards (INCITS) is the standard for defining connections in many networks, such as storage area networks (SANs). These standards include several sets of services which have historically been used by a computer system's I/O subsystem to determine and configure the various devices and links within a SAN. Fibre-channel services may also be used to further configure SAN devices and links to be allocated and/or shared among the multiple logical partitions that may be defined in an enterprise class server. Many fiber-channel systems do not define an interface that allows software to directly request information, specifically network topological information, from devices or other endpoints in the I/O subsystem.

BRIEF SUMMARY

Exemplary embodiments include a computer program product for procuring information from entities in a network via an Input/Output (I/O) processing system, including a tangible storage medium readable by a processing circuit and storing instructions for execution by the processing circuit for performing a method. The method includes: obtaining, by a channel subsystem, a transport command word (TCW) specified by an operating system, the TCW comprising an address of a transport services request block (TSRQB) and an address of a transport services response block (TSRSB); obtaining, by the channel subsystem, the TSRQB; building, by the channel subsystem, at least one command request based on the TSRQB, and sending, by the channel subsystem, the at least one command request from the channel subsystem to at least one network entity, the at least one command request including at least one of a fiber-channel generic services (FC-GS) request, a fiber-channel link services (FC-LS) request, and a fiber-channel link-level function (FC-SB) request; receiving, by the channel subsystem, a response to the at least one command request from the at least one network entity; and storing, by the channel subsystem, the response to the TSRSB based on the address of the TSRSB obtained from the TCW.

Other exemplary embodiments include a system for procuring information from entities in a network via an Input/Output (I/O) processing system, the system including a channel subsystem for communication with an I/O operating system and the network entity. The channel subsystem is configured to perform a method including: obtaining, by the channel subsystem, a transport command word (TCW) specified by an operating system, the TCW comprising an address of a transport services request block (TSRQB) and an address of a transport services response block (TSRSB); obtaining, by the channel subsystem, the TSRQB; building, by the channel subsystem, at least one command request based on the TSRQB, and sending, by the channel subsystem, the at least one command request from the channel subsystem to at least one network entity, the at least one command request including at least one of a fiber-channel generic services (FC-GS) request, a fiber-channel link services (FC-LS) request, and a fiber-channel link-level function (FC-SB) request; receiving, by the channel subsystem, a response to the at least one command request from the at least one network entity; and storing, by the channel subsystem, the response to the TSRSB based on the address of the TSRSB obtained from the TCW.

Further exemplary embodiments include a computer-implemented method for procuring information from entities in a network via an Input/Output (I/O) processing system, including: obtaining, by a channel subsystem, a transport command word (TCW) specified by an operating system, the TCW comprising an address of a transport services request block (TSRQB) and an address of a transport services response block (TSRSB); obtaining, by the channel subsystem, the TSRQB; building, by the channel subsystem, at least one command request based on the TSRQB, and sending, by the channel subsystem, the at least one command request from the channel subsystem to at least one network entity, the at least one command request including at least one of a fiber-channel generic services (FC-GS) request, a fiber-channel link services (FC-LS) request, and a fiber-channel link-level function (FC-SB) request; receiving, by the channel subsystem, a response to the at least one command request from the at least one network entity; and storing, by the channel subsystem, the response to the TSRSB based on the address of the TSRSB obtained from the TCW.

Other systems, methods, and/or computer program products according to embodiments will be or become apparent to one with skill in the art upon review of the following drawings and detailed description. It is intended that all such additional systems, methods, and/or articles of manufacture be included within this description, be within the scope of the present invention, and be protected by the accompanying claims.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

In accordance with an aspect of the present invention, communication between an operating system and components of an input/output (I/O) processing system is facilitated. For instance, a mechanism is provided by which information from communications between channel subsystems and network entities, such as via fiber-channel communications, is presented to the operating system. The system allows the operating system to request information, which the channel subsystem can request from network entities. The resulting answers/responses can be provided by the channel subsystem to the operating system. The system allows, for example, the operating system to query a network to discover network topology.

An example of an I/O processing system incorporating and using one or more aspects of the present invention is described with reference to FIG. 1. I/O processing system or network 100 includes, for instance, a main memory 102, one or more central processing units (CPUs) 104, a storage control element 106, a channel subsystem 108, and one or more nodes 110, each of which is described below.

Nodes 110 encompass a variety of devices and points within the network 100. FIG. 1 illustrates examples of network topologies. The network 100 is merely exemplary, as the number and configuration of points and/or devices in the network 100 is not limited. As shown, the channel subsystem 108 connects to various nodes 110. The nodes 110 include, for example, one or more network entities 116 such as one or more control units 112 in communication with one or more I/O devices 114. The channel subsystem 108 is coupled to control units 110, which provide logic to operate and control one or more I/O devices 114 or other entities 116 and adapts, through the use of common facilities, the characteristics of each I/O device 114. The common facilities provide for the execution of I/O operations, indications concerning the status of the I/O device 114 and the control unit 110, control of the timing of data transfers and certain levels of I/O device 112 control.

Examples of network entities 116 include control units 112, I/O devices 114, service entities such as fibre channel name servers and managers, and other suitable entities or devices. Examples of I/O devices include workstations, file servers, and peripherals such as printers, scanners, storage devices and output/display devices. Additional examples of I/O devices 114 include card readers and punches, magnetic tape units, direct access storage devices, displays, keyboards, pointing devices, teleprocessing devices, communication controllers and sensor based equipment, to name a few.

Main memory 102 stores data and programs, which can be input from the I/O devices 112 and/or other network entities 116. For example, the main memory 102 may include one or more operating systems 103 or other software that are executed by one or more of the CPUs 104. As used herein, "operating system" refers to any computer program, software, interface or device that is responsible for the management of computer resources for processors or other devices such as the host system, main memory 102 and CPU 104. The main memory 102 is directly addressable and provides for high-speed processing of data by the CPUs 104 and the channel subsystem 108.

The CPU 104 is the controlling center of the I/O processing system 100. It contains sequencing and processing facilities for instruction execution, interruption action, timing functions, initial program loading, and other machine-related functions. The CPU 104 is coupled to the storage control element 106 via a connection 118, such as a bidirectional or unidirectional bus.

The storage control element 106 is coupled to the main memory 102 via a connection 120, such as a bus; to the CPUs 104 via a connection 118; and to the channel subsystem 108 via a connection 122. The storage control element 106 controls, for example, queuing and execution of requests made by the CPU 104 and the channel subsystem 108.

The channel subsystem 108 is coupled to the storage control element 106, as described above, and to each of the control units 110 via a connection 124, such as a serial link. The connection 124 may be implemented as an optical link, employing single-mode or multi-mode waveguides. The channel subsystem 108 directs the flow of information between the nodes 110 and the main memory 102. It relieves the CPUs 104 of the task of communicating directly with the nodes 110 and permits data processing to proceed concurrently with I/O processing. The channel subsystem 108 uses one or more channel paths 126 as the communication links in managing the flow of information to or from nodes 110. As a part of the I/O processing, the channel subsystem 108 also performs the path-management functions of testing for channel path availability, selecting an available channel path 126 and initiating execution of the operation with the nodes 110.

Figure 1:
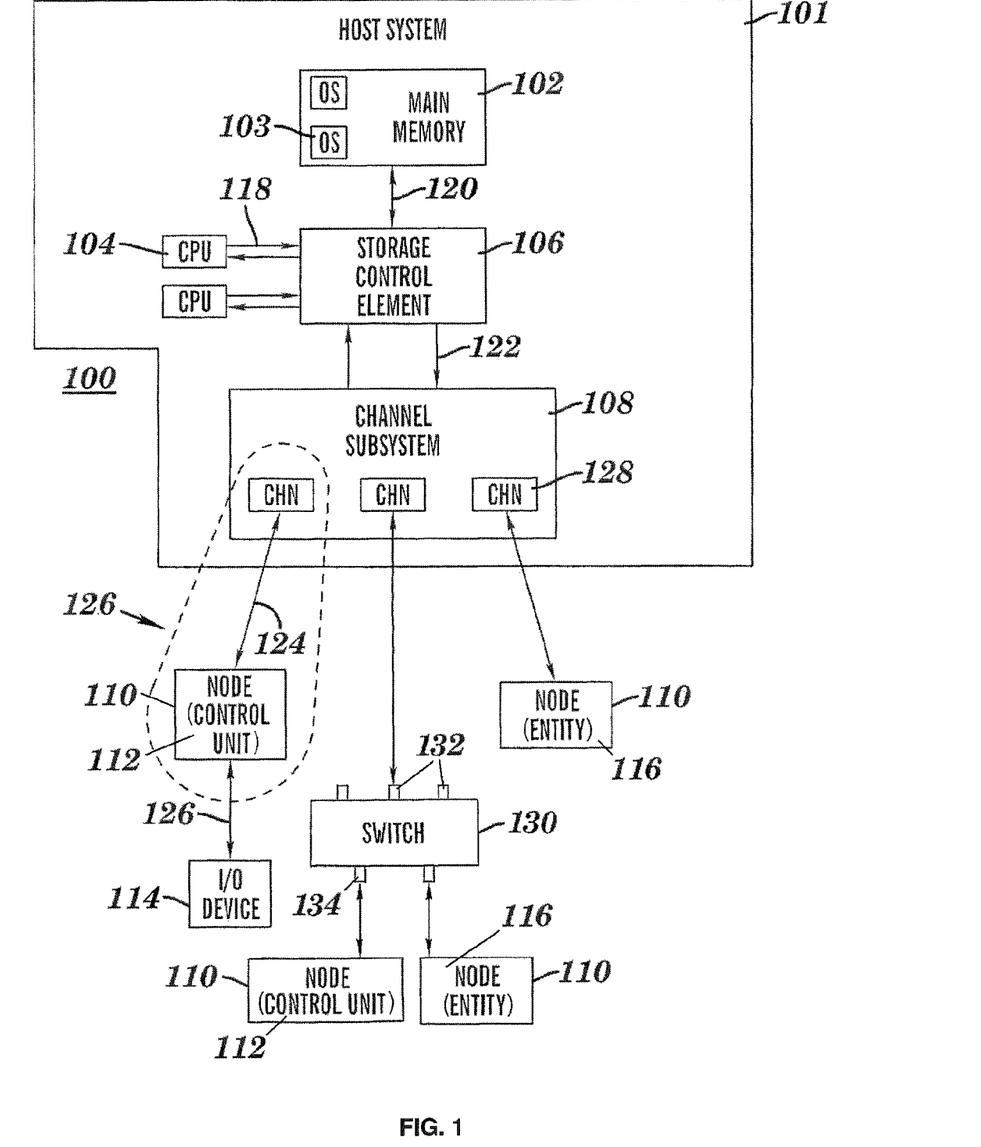
FIG. 1 depicts an exemplary embodiment of a network including an I/O processing system.

Each channel path 126 includes a channel 128 (channels 128 are located within the channel subsystem 108, in one example, as shown in FIG. 1), one or more nodes 110 and one or more connections 124. In one embodiment, one or more of the channels 128 and/or connections 124 are connected to one or more dynamic switches such as a fabric switch 130. In this embodiment, the fabric switch 130 is part of the channel path 126 between the channel subsystem 108 and nodes 110. The fabric switch 30 includes input ports 132 and output ports 134 through which the channel subsystem may be connected to various entities 116. The network 100 topology, including the host system, the network entities 116, the channel subsystem 108, the fabric switches 130, and/or input and output ports of the fabric switch 130 forms a "fabric". For example, for a network 100 incorporating a fiber-channel protocol, the channel subsystem 108 and the nodes 110 are connected to one or more fabric switches 130 to form a "Fibre Channel fabric". The fabric switch 30 can be coupled to a channel 124 and a node 110 or multiple channels 124 and nodes 110 and provides the capability of physically interconnecting any two links that are connected to the fabric switch 130.

Also located within the channel subsystem 108 are subchannels (not shown). One subchannel is provided for and dedicated to each I/O device 112 accessible to a program through the channel subsystem 108. A subchannel (e.g., a data structure, such as a table) represents the logical state of a device to a program. Each subchannel provides information concerning the associated I/O device or other node 110 and its attachment to the channel subsystem 108. The subchannel also provides information concerning I/O operations and other functions involving the associated node 110. The subchannel is the means by which the channel subsystem 108 provides information about associated nodes 110 to operating systems running on the CPUs 104, which obtain this information by executing I/O instructions.

One or more of the above components of the I/O processing system are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

In one embodiment, to transfer data between I/O devices 112 or other entities 116 and memory 102, channel command words (CCWs) are used. A CCW specifies the command to be executed, and includes other fields to control processing. One or more CCWs arranged for sequential execution form a channel program, also referred to herein as a CCW channel program. The CCW channel program is set up by, for instance, an operating system, or other software.

Figure 2:
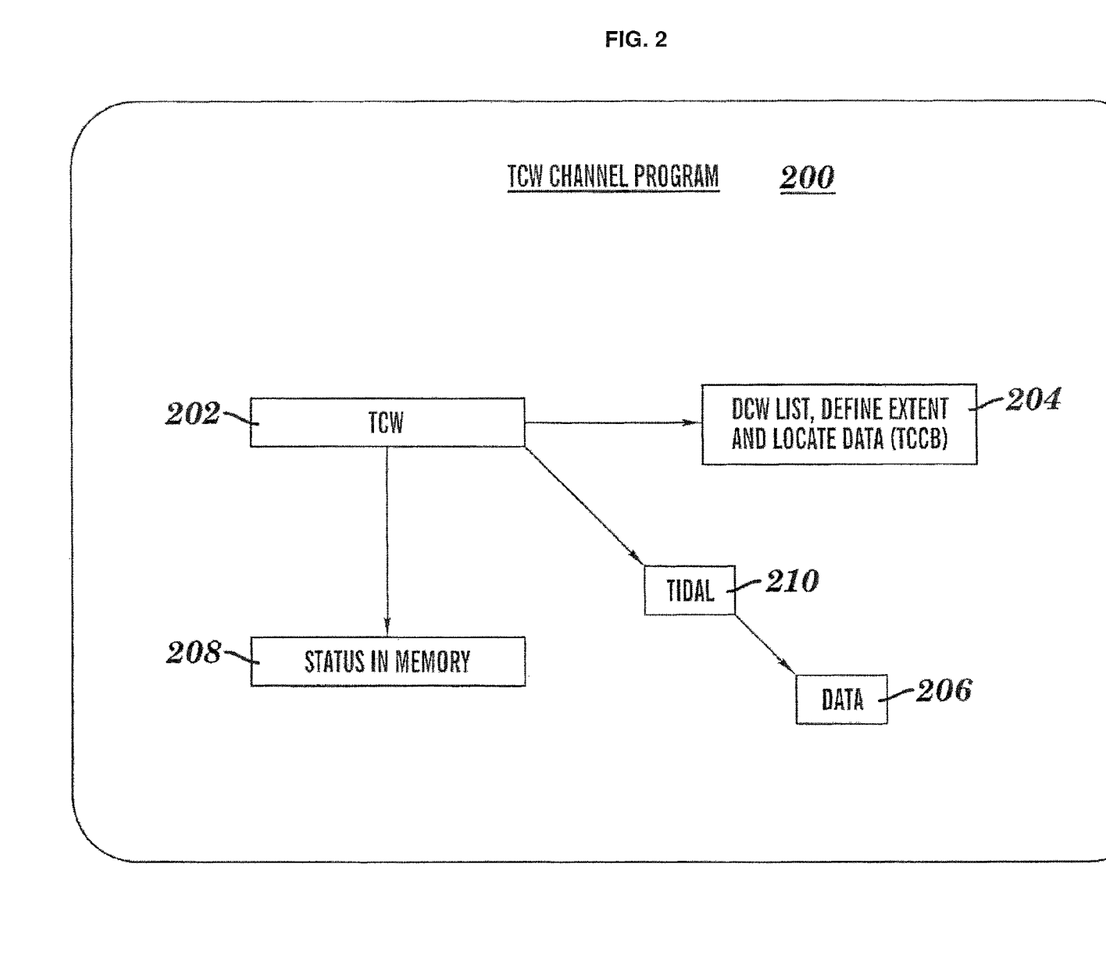
FIG. 2 depicts an exemplary embodiment of a transport control word channel program.

One example of a channel program 200 includes a transport command control block (TCCB) 204, instead of separate individual CCWs, is described with reference to FIG. 2. The total number of exchanges and sequences between the channel and control unit is reduced through collapsing multiple commands of the channel program into a TCCB. The TCCB 204 includes, for example, device command word (DCWs) and control data such as define extent data and location data. As shown, a channel program 200, referred to herein as a transport command word (TCW) channel program, includes a TCW 202 specifying a location in memory of a TCCB 204, as well as a location in memory of a data area 206 or a transport mode indirect data address list (TIDAL) 210 (i.e., a list of transport mode indirect data address words (TIDAWs)) each pointing to a portion of the data area 206, and a status area 208. TCWs, TCCBs, and status are described in further detail below.

The processing of a TCW channel program 200 is described with reference to FIG. 3. The link protocol used for these communications is, for instance, Fibre Channel Protocol (FCP). In particular, three phases of the FCP link protocol are used, allowing host bus adapters to be used that support FCP to perform data transfers controlled by DCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety. Another link protocol used for the communications is FICON (Fibre Connectivity), in this example. Information regarding FICON is described in "Fibre Channel Single Byte Command Code Sets-2 Mapping Protocol (FC-SB-3), T11/Project 1357-D/Rev. 1.6, INCITS (March 2003), which is hereby incorporated herein by reference in its entirety.

Figure 3:
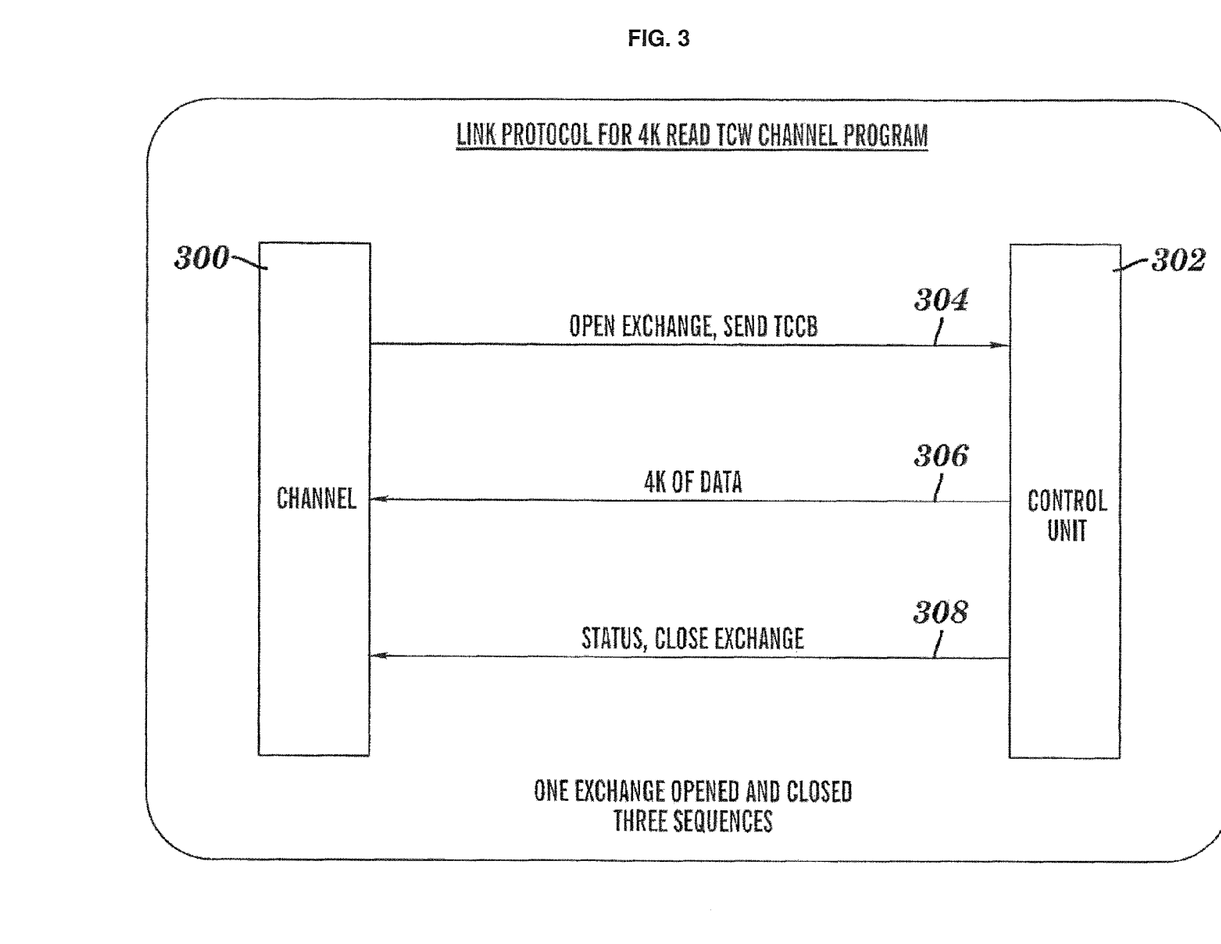
FIG. 3 depicts an exemplary embodiment of a link protocol used to communicate between a channel and control unit to execute the transport control word channel program of FIG. 2.

Referring to FIG. 3, a channel 300 opens an exchange with a control unit 302 and sends TCCB 304 to the control unit 302. In one example, the TCCB 304 and sequence initiative are transferred to the control unit 302 in a FCP command, referred to as FCP_CMND information unit (IU) or a transport command IU. The control unit 302 executes the multiple commands of the TCCB 304 (e.g., define extent command, locate record command, read command as device control words (DCWs)) and forwards data 306 to the channel 300 via, for instance, a FCP_Data IU. It also provides status and closes the exchange 308.

In an exemplary embodiment, the operating system 103 is configured to be able to receive network information, such as topology information, by request from one or more nodes 110 in the network 100. The operating system 103 utilizes network and/or fabric services by prompting the channel subsystem 108 to send requests (e.g., service requests) to one or more entities 116, allowing the operating system 103 to procure information regarding the entities 116 and the network configuration. This configuration information (such as entity identification, port availability, amount of bandwidth available, type of service entity, logical path information, and others) can be presented to a user when requested to aid in defining I/O configuration definitions.

Figure 4:
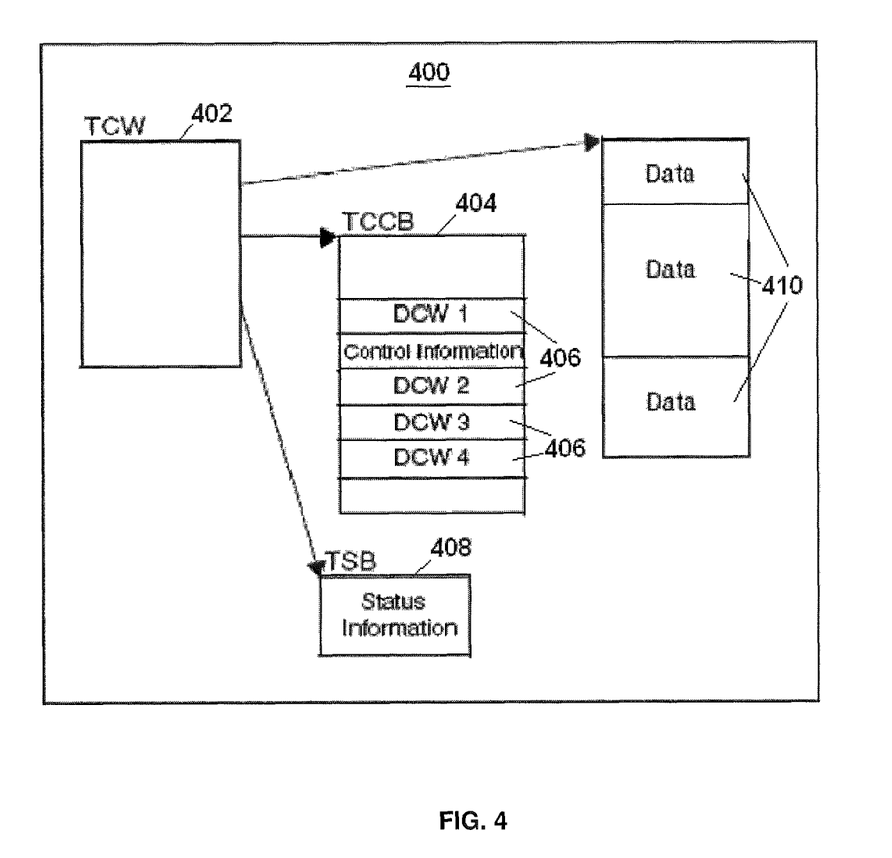
FIG. 4 depicts an exemplary embodiment of a TCW channel program.
Figure 5:
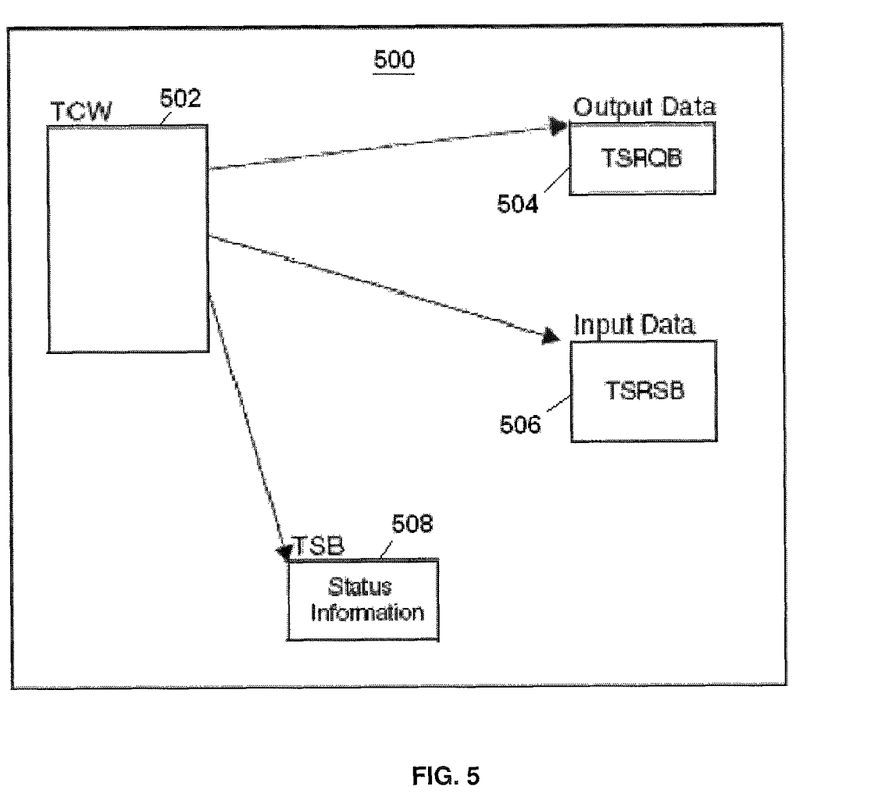
FIG. 5 depicts an exemplary embodiment of a TCW channel program.

FIGS. 4 and 5 show exemplary embodiments of use of the TCW 202 to procure configuration information from one or more entities 116 or nodes 110. FIG. 4 illustrates an exemplary channel program that is sent by the channel subsystem 108 to one or more entities 116, such as control units 112, to request information. The channel subsystem 108, after identifying a control unit 112 as compatible with the protocol used by the channel subsystem 108, generates and sends a channel program 400 that includes a TCW 402 and one or more commands in a block, referred to herein as a transport command control block (TCCB) 404, an address of which is specified in the TCW 402. The TCCB 404 includes a number of DCWs 406 that provide the individual commands.

The TCW 402 specifies the address of the TCCB 404, a transport-status block (TSB) 408, and either an input our output data area 410. The TCCB 404 contains, for example, from 1 to 30 commands that are transported to a control unit 112 (or other entity 116) for execution. The control unit 112 processes the channel program 400, which is parsed and executed on the control unit 112. The control unit 112 may then generate a response message in response to executing the channel program.

FIG. 5 illustrates another exemplary channel program 500 that does not include a TCCB. This channel program includes a TCW 502 that designates a transport-services-request block (TSRQB) 504 in an output-data area, a transport-services-response block (TSRSB) 506 in the input-data area, and a TSB 508. The TSRQB 504 includes various requests for topology, status or other information specified by the operating system 103.

Examples of such requests include, for example in the instance that the network utilizes a Fibre Channel protocol, a fiber-channel generic services (FC-GS) request, a fiber-channel link services (FC-LS) request, and a fiber-channel link-level function (FC-SB) request. Exemplary fiber-channel requests are further described in InterNational Committee for Information Technology Standards (INCITS) standards such as INCITS 424-2007, "Fibre Channel-Framing and Signaling-2 (FC-FS-2)", INCITS 374-2003, "Fibre Channel-Single Byte Command Code Sets-3 (FC-SB-3)", and INCITS 427: 2007, "Fibre Channel Generic Services-5 (FC-GS-5)", which are hereby incorporated herein by reference in their entirety.

The channel subsystem 108 uses the information in the TSRQB 504 to format and send the actual service request to the appropriate fabric destination, i.e., node 110 or entity 116. When the channel subsystem receives the response to the request, the TSRSB 506 provides a place in software storage and a structure for the channel subsystem to write a copy of the response to the operating system.

Figure 6:
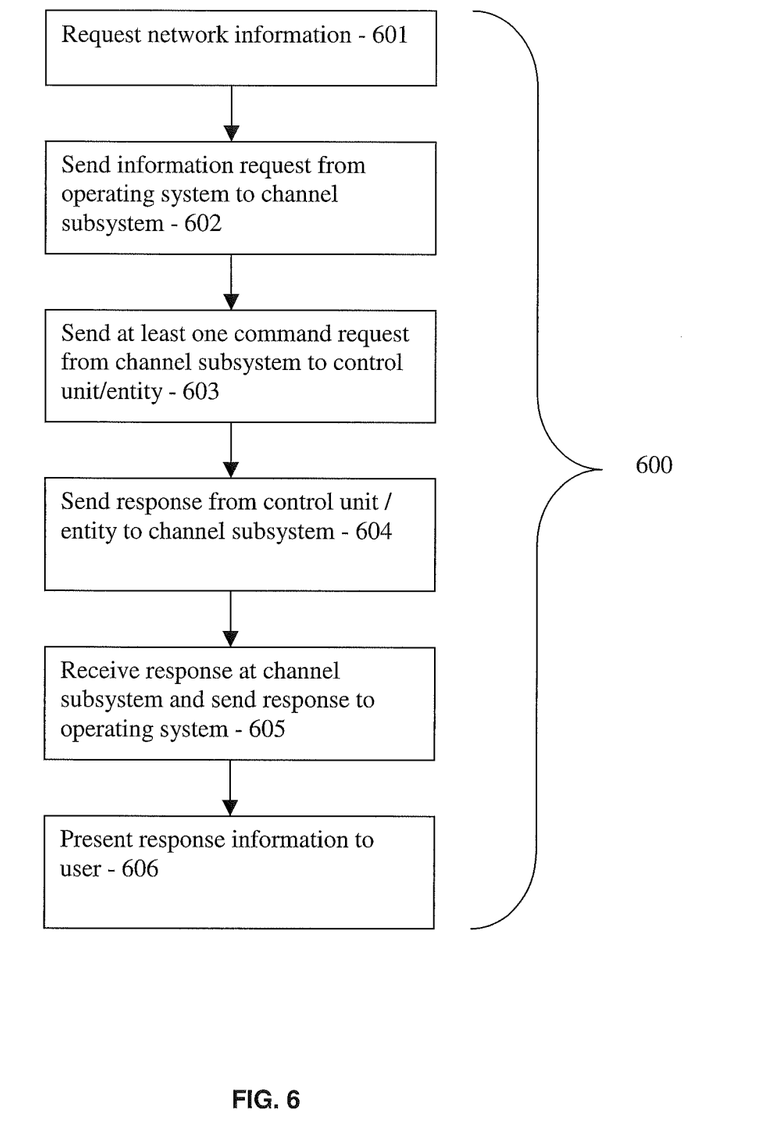
FIG. 6 is a flow chart depicting an exemplary embodiment of a method of procuring information from entities in a network via an Input/Output (I/O) processing system.

Referring to FIG. 6, an exemplary method 600 of procuring information from entities in a network via an I/O processing system is illustrated. The method 600 includes one or more stages 601-606. The method may be used in conjunction with the network 100, but may also be used with any suitable Fibre Channel or other network configuration. The method 600 may include the execution of all of stages 601-606 in the order described. However, certain stages may be omitted, stages may be added, or the order of the stages changed.

In the first stage 601, a user requests information regarding the network 100. This information may include topology information, identification information regarding various nodes 110, availability of various ports 132, 134, bandwidth availability and others. In one example, the user requests the information to facilitate creation or modification of the network's I/O configuration definition.

In the second stage 602, the operating system 103 sends an information request to a channel subsystem 108. In one embodiment, the operating system 103 specifies specific types of requests to the channel subsystem, such as identification and status requests. Examples of such requests include service requests such as fiber-channel generic services (FC-GS) requests, fiber-channel link services (FC-LS) requests, or fiber-channel link-level function (FC-SB) requests.

In the third stage 603, the channel subsystem 108 builds and sends at least one command request to one or more control units 112 or other entities 116. In one embodiment, the channel subsystem 108 sends one or more command request in the form of at least one channel program including a TCW 202, 402, or 502. The channel program includes, for example, TCW 502, TSRQB 504, TSRSB 506 and TSB 508. Command requests include various requests to open communications between the channel subsystem and the service entity, such as requests for logical paths or log-in requests. Various service requests may be sent, such as FC-GS requests, FC-LS requests, or FC-SB requests.

Examples of FC-GS requests include name, time and alias service requests. Examples of FC-LS requests include basic-link-service (BLS) commands, and extended-link-service (ELS) commands such as port log-in and log-out, state change notification, request node identification data and registered link-incident record. An example of an FC-SB request is test initialization.

In the fourth stage 604, the control unit 112 or other entity 116 receives the at least one command request from the channel subsystem 108, and generates at least one appropriate response. The response is sent to the channel subsystem 108 in, for example, a TSRSB 506.

In the fifth stage 605, the channel subsystem 108 receives the at least one response to the request and transmits the at least one response to the operating system 103. In one embodiment, if the channel subsystem 108 receives multiple responses, it coalesces the multiple responses into a single response and transmits the single response to the operating system 103. The operating system 103 may then provide the response information to a user or process the response programatically.

In one example, the channel subsystem 108 receives the at least one response in, for example, TSRSB 506, and provides the at least one response to the operating system 103 by writing the response to a designated area in the main memory 102, which is then accessed by the operating system 103. The designated area may be designated by, for example, TSRSB 506.

In the sixth stage 606, the operating system 103 presents the response information to a user. The user can utilize the response information as desired, such as to create or modify an I/O configuration definition for the network 100. As described herein, a "user" is a person or other computing entity such as a computer program requesting and/or receiving the response information.

The following is an example of a utilization of the computer program products, methods and systems described herein. In this example, a user desires to create or update an I/O configuration definition for a storage area network (SAN) such as the network 100 shown in FIG. 1. The user may then prompt the operating system 103, or the operating system 103 may periodically or at pre-selected times prompt the channel subsystem 108 to provide network information.

In one example, the operating system 103 sends a request via the channel subsystem 108 to a directory server or other location to return all ports in the network 100 that support a selected Fibre Channel protocol type. The directory server returns with identification of all of the qualifying nodes.

In another example, the operating system 103 sends a request to the channel subsystem 108 which in turn sends a TCW channel program request such as that shown in FIG. 5, that includes a request node identification (RNID) message. Each service entity (e.g., control unit 112) connected to a qualifying node receives the RNID and returns a response including node identification data that describes various aspects of the device (e.g., I/O device 114) that is connected to the node. Additional requests may also be sent in the TCW channel program or in subsequent channel programs, such as the amount of resource available at the node or in the device.

Each device sends a response providing the requested information to the channel subsystem 108, which in turn sends the responses to the operating system 103 by, for example, writing copies of the response in a designated area in the main memory. The designated area may be a data area specified by a TSRSB, for example. The operating system 103 may then provide a list of potential node or device candidates so that the user can determine how to configure the network.

Technical effects and benefits include providing a mechanism by which information exchanged between channels and control units or other entities can be presented to an operating system or other software, which can then be displayed to a user. Prior art configurations and techniques require that I/O configuration definitions be defined by a user by describing the logical definition of the channels control units and devices. The systems and methods described herein allows the configuration to be more effectively changed by allowing the operating system to request that the channel subsystem retrieve and return network information, and to present the network information to the user.

For example, plug-and-play-like capability is desired for various networks in order to simplify or eliminate the human work associated with creating and changing the I/O configuration definition. However, prior fibre channel architectures define an interface that allows software to make fiber-channel services requests and receive the responses to those requests so that the software can use the response information to interact with a human. The systems and methods described herein enhances networks to provide software a means to request that the I/O subsystem (e.g., a channel subsystem) transmit fibre channel services requests, capture the associated responses, and provide the responses to the software.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
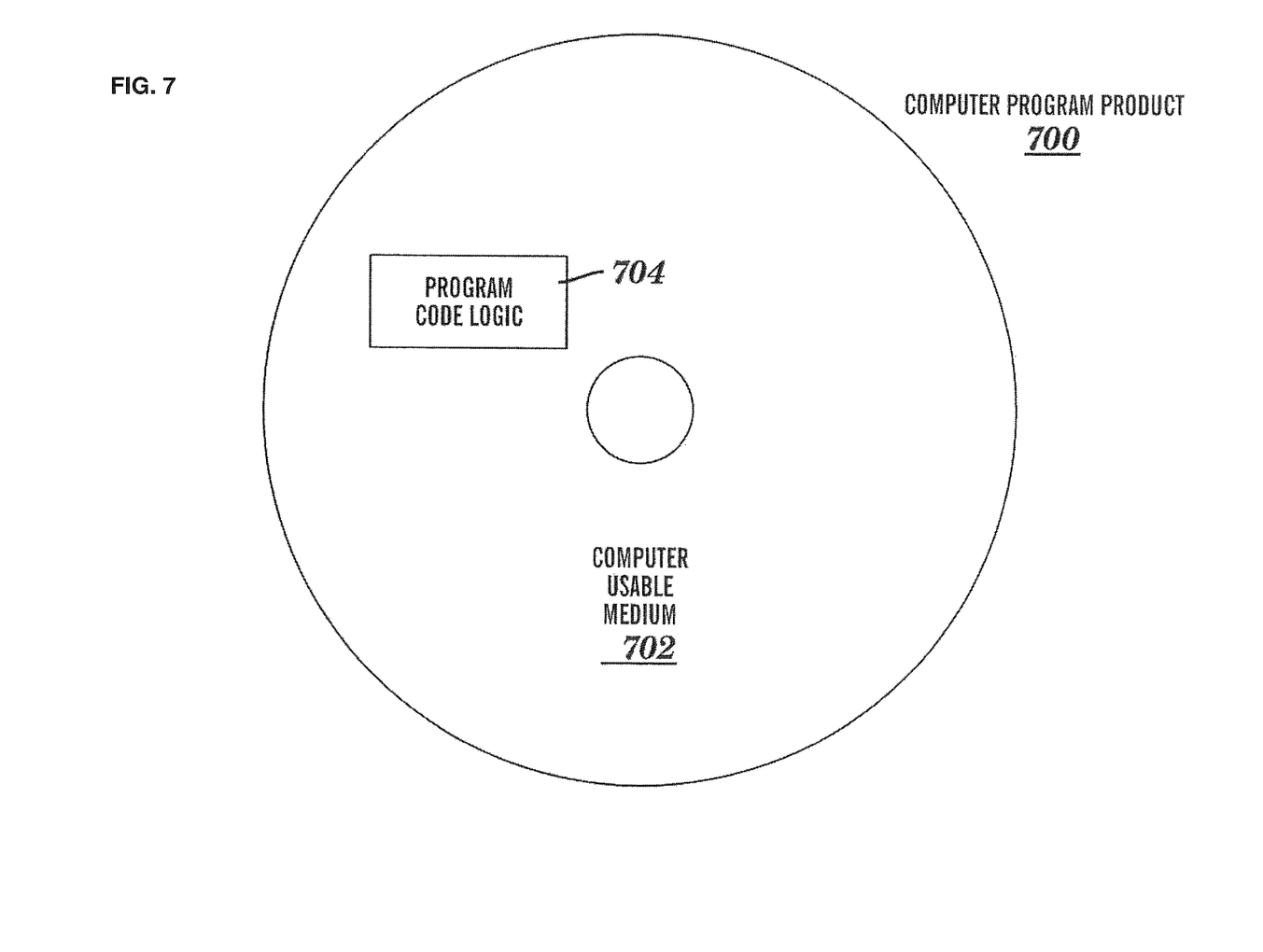
FIG. 7 depicts an exemplary embodiment of a computer program product for procuring information from entities in a network via an Input/Output (I/O) processing system.

As described above, embodiments can be embodied in the form of computer-implemented processes and apparatuses for practicing those processes. In exemplary embodiments, the invention is embodied in computer program code executed by one or more network elements. Embodiments include a computer program product 700 as depicted in FIG. 7 on a computer usable medium 702 with computer program code logic 704 containing instructions embodied in tangible media as an article of manufacture. Exemplary articles of manufacture for computer usable medium 702 may include floppy diskettes, CD-ROMs, hard drives, universal serial bus (USB) flash drives, or any other computer-readable storage medium, wherein, when the computer program code logic 1004 is loaded into and executed by a computer, the computer becomes an apparatus for practicing the invention. Embodiments include computer program code logic 704, for example, whether stored in a storage medium, loaded into and/or executed by a computer, or transmitted over some transmission medium, such as over electrical wiring or cabling, through fiber optics, or via electromagnetic radiation, wherein, when the computer program code logic 704 is loaded into and executed by a computer, the computer becomes an apparatus for practicing the invention. When implemented on a general-purpose microprocessor, the computer program code logic 704 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for procuring information from entities in a network via an Input/Output (I/O) processing system, comprising:
  a non-transitory tangible storage medium readable by a processing circuit and storing instructions for execution by the processing circuit for performing a method comprising:
  obtaining, by a channel subsystem, a transport command word (TCW) specified by an operating system, the TCW comprising an address of a transport services request block (TSRQB) and an address of a transport services response block (TSRSB);
  obtaining, by the channel subsystem, the TSRQB;
  building, by the channel subsystem, at least one command request based on the TSRQB, and sending, by the channel subsystem, the at least one command request from the channel subsystem to at least one network entity, the at least one command request including at least one of a fiber-channel generic services (FC-GS) request, a fiber-channel link services (FC-LS) request, and a fiber-channel link-level function (FC-SB) request;
  receiving, by the channel subsystem, a response to the at least one command request from the at least one network entity; and
  storing, by the channel subsystem, the response to the TSRSB based on the address of the TSRSB obtained from the TCW.

2. The computer program product of claim 1, wherein the at least one network entity includes a control unit configured to control an input/output (I/O) device for executing an I/O operation.

3. The computer program product of claim 1, wherein the method further comprises obtaining, by the channel subsystem, another TCW, the another TCW including an address of a transport command control block (TCCB).

4. The computer program product of claim 3, wherein the method further comprises retrieving, by the channel subsystem, the TCCB based on the address specified by the another TCW and sending the TCCB to the at least one network entity, the TCCB configured to hold a plurality of input/output (I/O) commands.

5. The computer program product of claim 1, wherein obtaining the TCW is based on at least one network topology information request from the operating system.

6. The computer program product of claim 5, wherein the method further comprises at least one of receiving the at least one network topology information request from a user and sending the response to the user from the operating system.

7. The computer program product of claim 1, wherein the FC-GS request includes at least one of a name, time and alias service request.

8. The computer program product of claim 1, wherein the FC-LS request includes at least one of a basic-link-service (BLS) command, an extended-link-service (ELS) command, a port log-in request, a port log-out request, a state change notification request, a node identification data request, and a registered link-incident record request.

9. The computer program product of claim 1, wherein the FC-SB request includes a test initialization request.

10. A system for procuring information from entities in a network via an Input/Output (I/O) processing system, the system comprising:
  a channel subsystem for communication with an I/O operating system and the network entity, the channel subsystem configured to perform a method comprising:
  obtaining, by the channel subsystem, a transport command word (TCW) specified by an operating system, the TCW comprising an address of a transport services request block (TSRQB) and an address of a transport services response block (TSRSB);
  obtaining, by the channel subsystem, the TSRQB;
  building, by the channel subsystem, at least one command request based on the TSRQB, and sending, by the channel subsystem, the at least one command request from the channel subsystem to at least one network entity, the at least one command request including at least one of a fiber-channel generic services (FC-GS) request, a fiber-channel link services (FC-LS) request, and a fiber-channel link-level function (FC-SB) request;
  receiving, by the channel subsystem, a response to the at least one command request from the at least one network entity; and
  storing, by the channel subsystem, the response to the TSRSB based on the address of the TSRSB obtained from the TCW.

11. The system of claim 10, wherein the at least one network entity includes a control unit configured to control an I/O device for executing an I/O operation.

12. The system of claim 10, wherein the method further comprises obtaining, by the channel subsystem, another TCW, the another TCW specifying an address of a transport command control block (TCCB).

13. The system of claim 12, wherein the method further comprises retrieving, by the channel subsystem, the TCCB based on the address specified by the another TCW and sending the TCCB to the at least one network entity, the TCCB configured to hold a plurality of input/output (I/O) commands.

14. The system of claim 10, wherein:
the FC-GS request includes at least one of a name, time and alias service request;
the FC-LS request includes at least one of a basic-link-service (BLS) command, an extended-link-service (ELS) command, a port log-in request, a port log-out request, a state change notification request, a node identification data request, and a registered link-incident record request; and
the FC-SB request includes a test initialization request.

15. A computer-implemented method for procuring information from entities in a network via an Input/Output (I/O) processing system, comprising:
obtaining, by a channel subsystem, a transport command word (TCW) specified by an operating system, the TCW comprising an address of a transport services request block (TSRQB) and an address of a transport services response block (TSRSB);
obtaining, by the channel subsystem, the TSRQB;
building, by the channel subsystem, at least one command request based on the TSRQB, and sending, by the channel subsystem, the at least one command request from the channel subsystem to at least one network entity, the at least one command request including at least one of a fiber-channel generic services (FC-GS) request, a fiber-channel link services (FC-LS) request, and a fiber-channel link-level function (FC-SB) request;
receiving, by the channel subsystem, a response to the at least one command request from the at least one network entity; and
storing, by the channel subsystem, the response to the TSRSB based on the address of the TSRSB obtained from the TCW.

16. The method of claim 15, wherein the at least one network entity includes a control unit configured to control an input/output (I/O) device for executing an I/O operation.

17. The method of claim 15, further comprising obtaining, by the channel subsystem, another TCW, the another TCW including an address of a transport command control block (TCCB).

18. The method of claim 17, further comprising retrieving, by the channel subsystem, the TCCB based on the address specified by the another TCW and sending the TCCB to the at least one network entity, the TCCB configured to hold a plurality of input/output (I/O) commands.

19. The method of claim 15, wherein building the at least one command request includes building a fibre channel command program.

20. The method of claim 15, wherein obtaining the TCW is based on at least one network topology information request from the operating system.

21. The method of claim 20, wherein the method further comprises at least one of receiving the at least one network topology information request from a user and sending the response to the user from the operating system.

22. The method of claim 15, wherein the FC-GS request includes at least one of a name, time and alias service request.

23. The method of claim 15, wherein the FC-LS request includes at least one of a basic-link-service (BLS) command, an extended-link-service (ELS) command, a port log-in request, a port log-out request, a state change notification request, a node identification data request, and a registered link-incident record request.

24. The method of claim 15, wherein the FC-SB request includes a test initialization request.

* * * * *